(12) United States Patent
Hills et al.

(10) Patent No.: US 6,283,366 B1
(45) Date of Patent: *Sep. 4, 2001

(54) CHECK WRITING POINT OF SALE SYSTEM

(75) Inventors: Robert R. Hills, St Augustine, FL (US); Henry R. Nichols, McLean, VA (US)

(73) Assignee: ChequeMark Patent Inc., Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 09/562,303

(22) Filed: May 1, 2000

Related U.S. Application Data (63) Continuation of application No. 08/775,400, filed on Dec. 31, 1996, now Pat. No. 6,164,528.

(51) Int. Cl.[7] ................................................. G06R 17/60
(52) U.S. Cl. ............................................. 235/379; 235/380
(58) Field of Search ....................................... 235/379, 380

(56) References Cited

U.S. PATENT DOCUMENTS

| | | |
|---|---|---|
| 3,824,544 | 7/1974 | Simjian . |
| 3,845,470 | 10/1974 | Schuller . |
| 4,270,042 | 5/1981 | Case . |
| 4,321,672 | 3/1982 | Braun et al. . |
| 4,404,649 | 9/1983 | Nunley et al. . |
| 4,523,330 | 6/1985 | Caine . |
| 4,580,040 | 4/1986 | Granzow et al. . |
| 4,617,457 | 10/1986 | Granzow et al. . |
| 4,672,377 | 6/1987 | Murphy et al. . |
| 4,673,802 | 6/1987 | Ohmae et al. . |
| 4,678,895 | 7/1987 | Tateisi et al. . |
| 4,678,896 | 7/1987 | Carlson et al. . |
| 4,743,743 | 5/1988 | Fukatsu . |
| 4,810,866 | 3/1989 | Lord, Jr. . |
| 4,823,264 | 4/1989 | Deming . |
| 4,933,536 | 6/1990 | Lindemann et al. . |
| 4,934,772 | 6/1990 | Sakuma et al. . |
| 5,053,607 | 10/1991 | Carlson et al. . |
| 5,175,682 | 12/1992 | Higashiyama et al. . |
| 6,164,528 | * 12/2000 | Hisss et al. ........................... 235/378 |

FOREIGN PATENT DOCUMENTS 54-119859 * 9/1979 (JP) .

* cited by examiner

*Primary Examiner*—Harold I. Pitts
(74) *Attorney, Agent, or Firm*—Roberts Abokhair & Mardula, LLC (57) ABSTRACT

A point of sale system designed to read information from a consumer's check, credit card, or manual input with a subsequent debiting of a consumer's account and crediting merchant's account for the goods or services provided. Point of sale terminals are designed to accept a form of credit card with a consumer's bank account information encoded thereon or in the alternative to read the MICR number from a consumer's check in order to verify that a consumer has an appropriate balance to conduct the transaction with a given merchant. Thereafter the transaction of that information is transmitted to a central computer system which verifies the consumer's credit worthiness and stores the transaction event information for subsequent bank reconciliation via the ACH or other competing network. The invention eliminates the need for paper checks with all bank reconciliation being accomplished electronically. The present invention also includes fraud protection provisions such as velocity controls, social security checks, and scans. The present invention has the further flexibility to differentiate between "first time" consumer usage and those limits otherwise assigned to "known" consumer accounts. Additionally, there is not need for the present system to retain the consumer's check after verification.

28 Claims, 8 Drawing Sheets

Merchant Name
Street Address
City, ST Zip
Merchant Acct #

TIME 00:00 _M             DATE 00/00/00

BANK ACCT. NO. 000000000000

TRANSIT NO. 000000000

SALE AMOUNT             $ 0,000.00

TERMINAL ID 0000000000

I herewith authorize ChequeMARK Systems to electronically access my designated checking account for the payment of the above referenced purchase.

Name (PRINT) ______________________________

Street ______________________________

City __________________ ST______ Zip ________

Tel. Number: (______) ________-__________

I ACKNOWLEDGE THAT RETURN FEES WILL BE IMPOSED SHOULD MY PAYMENT BE DISHONORED AND UNDERSTAND THAT IT IS UNLAWFUL TO AUTHORIZE PAYMENTS FOR WHICH ADEQUATE MONIES ARE NOT AVAILABLE WITHIN MY ACCOUNT.

X______________________________
    Authorizing Signature

*FIG. 8*

Merchant Name
Street Address
City, ST Zip
Merchant Acct #

CUSTOMER BANKING INFORMATION:

BANK ACCT. NO. _________

TRANSIT NO. _________

SALE AMOUNT . . . . . . . . . . . . . . . . . . . . . $ _________

I herewith authorize ChequeMARK Systems to electronically access my designated checking account for the payment of the above referenced purchase amount. I acknowledge that sufficient funds are available for the payment of this sale.

Name (PRINT) _________________________
    Street _______________________________
    City _____________ ST _____ Zip _______
    Tel. Number: (____) ______ — __________

I FURTHER ACKNOWLEDGE THAT RETURN FEES WILL BE IMPOSED SHOULD MY PAYMENT BE DISHONORED AND UNDERSTAND THAT IT IS UNLAWFUL TO AUTHORIZE PAYMENTS FOR WHICH ADEQUATE MONIES ARE NOT AVAILABLE WITHIN MY ACCOUNT.

X _____________________
          Authorizing Signature

*FIG. 9*

CHECK WRITING POINT OF SALE SYSTEM

This application is a continuation application of U.S. patent application Ser. No. 08/775,400 filed Dec. 31, 1996 now U.S. Pat. No. 6,164,528.

RELATED PATENTS

This application is an improvement of U.S. Pat. No. 5,484988 to Hills et al. entitled "Check Writing Point of Sale System."

FIELD OF THE INVENTION

This invention relates to the field of Point-of-Sale systems and more particularly to the integration and processing of purchases whereby a check or encoded card is used as the basic source of identification of the individual and of the individual's bank and whereby the bank account is debited electronically.

BACKGROUND ART

Numerous devices exist for processing checks. For example, U.S. Pat. No. 4,933,536 to Lindemann, et al., describes a check processing device which is used together with a Point-of-Sale terminal. This particular device involves copying and taking a picture of an individual whereby a dishonored check could then be traced to the person who has offered it.

U.S. Pat. No. 4,810,866 to Lloyd. Jr., describes a check validation system again located together with a Point-of-Sale system for imprinting and otherwise physically dealing with a check.

Other systems also deal with an apparatus for handling checks at a point of sale. For example, U.S. Pat. No. 4,743,743 to Fukatsu describes one such transaction apparatus where a check is examined by a reader. U.S. Pat. No. 4,672,377 to Murhy, et al. describes a check authorization system wherein a check is imprinted with a bar code and information concerning customers which are stored in a database. U.S. Pat. No. 3,845,470 to Schuller discloses a vending system using a modified form of a check which is imprinted with identification codes, when someone attempts to use the check in purchasing goods and services, a vending operation will not place the order if information associated with the check is not valid in a particular database.

Other check-based financial systems have also been the subject of invention. U.S. Pat. No. 4,617,457 addresses an ATM or automatic teller machine form of cashing checks. Such systems create a picture of the check involved and also involves checking against a specialized database to insure that the check is a "valid" one (see also U.S. Pat. No. 4,580,040 to Granzow et al.).

Another generic category of financial systems deals with methods of handling the financial transactions apart from the physical handling of the check itself. For example, U.S. Pat. No. 3,824,544 to Simjian describes a merchant issued "check" which can be used in the purchase of goods and services and upon purchase, a specialized code is evaluated to determine if the check is being validly utilized.

U.S. Pat. No. 4,404,649 to Nunley et al. describes a document processing system which generally discloses a method of reading checks for processing a wide variety of financial documents.

U.S. Pat. No. 4,523,330 to Caine also describes a method for processing financial documents which systems also includes a Point-of-Sale terminal for generating image data from checks as they are being processed. This patent is drawn principally to the actual terminal itself.

U.S. Pat. No. 4,673,802 to Ohmae et al. describes a central processing system having stored data relating to the counts of users. Users are approved or disapproved at the Point-of-Sale based upon information in the database.

U.S. Pat. No. 4,270,042 to Case discloses a point of sale system that requires a consumer to prepay a sum of money into a special account that is accessed only by the system. This amount is inscribed on the card, and when a transaction made using the system, the amount of the transaction is punched out of a designated area on the card. This amount along with a signature and other information, is supplied on a draft negotiable instrument, which is given to the merchant at the time of the transaction. Thus, the Case system does away with the use of bank checks in effecting the transaction, but requires the use of specialized prepaid draft negotiable instruments that must be surrendered to the merchant.

U.S. Pat. No. 4,823,264 to Deming discloses a home banking system that can be used to transfer funds to different payees in satisfaction of debts incurred through previous purchases, use of utilities, etc. The system is consumer driven; that is, it is contemplated for use by the payor on a home personal computer. While the Deming system does away with the use of bank checks, account and other information must be keyed into the system. The Deming system cannot be used to read account and other information directly from an ordinary bank check and has no use for bank checks as instruments other than negotiable paper. Further, the Deming system cannot be used to transfer funds at the time of purchase and is not workable at the point of sale; the system can only be used to pay debts that have been incurred in the past and have accumulated.

Finally, U.S. Pat. No. 4,678,896 to Carlson et al. describes a Point-of-Sale system whereby an apparatus is provided to secure the processing and imprinting of checks.

All of these above patents deal with the specific problem of how to accept a check from a customer for the purchase of goods and services. They do not in any way address the subsequent processing of checks nor do they address the process by which checks are cleared through the normal automatic check handling clearinghouse operations that exist in the financial world. Thus, the interaction of these systems with the automated clearing house ("ACH") process is not addressed in any way. This is particularly important since if any Point-of-Sale check handling system is to interact with the ACH mechanism it must adhere to that processing scheme and must lend itself to use with a processing scheme.

Further, some of the currently used systems described above require the use of a bank check as a negotiable instrument which must be surrendered to a merchant. Some of the systems do away with the use of a bank checks altogether, but require a debit card or a specialized draft instrument to be used only with the particular system. None of these systems completely does away with the need and use for a negotiable draft instrument while using the consumer's bank check for identification and verification only. That is, current technologies such as check truncation, electronic check presentment and representment all require a consumer's initial issuance of a "paper" check. It is therefore an objective of the present invention to provide such a system.

It is an objective of the present invention to be adaptable for use with the ACH system and to be smoothly incorporated into it. In this fashion, the present invention will immediately be useful for a much wider range of financial transactions above and beyond those contemplated and disclosed in the background references discussed above.

SUMMARY OF THE INVENTION

The present invention comprises a process and apparatus which may be employed for the purpose of effecting payments for point-of-sale purchases of goods and services paid from consumer funds secured in bank checking or depository accounts. Each sale or "Transaction Event" would be an electronic and "paperless" event thereby eliminating reliance on accepting and processing commercial bank drafts (personal or corporate checks) and the physical handling of those bank drafts thus replacing commercial bank drafts at the point-of-sale.

In contrast to known systems, the present invention is a merchant driven system that can be used to process a transaction at the point of sale and at the time of purchase. The system is intended to be made available to subscribing merchants, businesses, and individuals herein referred to as "system subscribers" wishing to employ the method and apparatus of the present invention for the electronic processing and settlement of consumer purchases. Further, operational parameters of the present invention allow freedom from customary state or other geographically limiting criteria typical when accepting and processing "paper" checks. The system is designed to act with the national authorization networks and the electronic settlement network known as the ACH system as regulated by the National Automated Clearing House Association ("NACHA") or other comparable systems including but not limited to ECCHO, the Cactus Switch, First Tennessee Bank, regional networks, the VISA network, and others. The present invention contemplates Transaction Events processed in a manner hereinafter referred to as "Electronic Checks" or "Electronic Checking."

The system is designed to perform in a fully automated manner enabling each Transaction Event to be processed by a system subscriber as a point-of-sale transaction in the presence of the consumer. Subsequent to a Transaction Event's being "Approved", funds are debited from an authorized consumer account for credit to the system subscriber, and electronic settlement by ACH deposit of the transaction amount to the subscriber's designated depository account. Authorized access to consumer accounts and credits to system subscriber depository accounts are performed as "Off-Line" transactions by means of Electronic Funds Transfer ("EFT") through the ACH Network or through the Federal Reserve System. "On-Line" transactions are also contemplated by the present invention once national networking and other present and proposed support mechanisms have become functional.

The present invention comprises a point-of-sale processing system having electronic data processing equipment which supports various individual service selections or transactions types each of which provide automated, electronic processing from consumer bank checking or depository accounts in payment of goods or services incurred at a system subscriber's point-of-sale. It is the objective of the present invention to automate the point-of-sale environment for processing consumer purchases of goods and services would customarily necessitate the more traditional acceptance and processing of commercial bank drafts (personal and/or corporate checks). Individual Transaction Events are administered under the system of the present invention by initiating a terminal authorization inquiry and continuing through the electronic settlement of funds representing the Transaction Event. As a result of the above procedure, approved consumer banking accounts are debited and system subscribers' designated depository accounts are credited.

It is a further objective of the present invention to eliminate the need for "paper" checks as an accepted means of consumer payment. In the place of personal and business checks, consumers would be provided greater access to funds secured in bank accounts to effect purchases initiated from the point-of-sale. System subscribers electronically communicate with the data center of the present invention for individual Transaction Event authorizations which, upon reconciliation of a day's activity, result in an EFT processed by means of the Automated Clearing House accommodating an "Off-Line" or "On-Line" debiting of preauthorized consumer Transaction Events from approved accounts. Thereafter, each system subscriber is credited with the total of all such daily authorized Transaction Events to its designated bank depository account. The present invention also accommodates paper transactions as requested by the subscribing merchant or consumer. By way of example, transactions can be supported where the consumer prepared a "paper" check. The transaction would proceed in a fully electronic manner with the consumer retaining the "paper" check as an additional receipt.

The present invention comprises logic which allows the following services each of which, when individually performed or are combined with other services, establish a wholly unique processing medium enabling preauthorized access to consumers' checking account or bank depository reserves in payment of and settlement for purchases conducted from a system subscriber's point-of-sale.

Authorization

This service supports electronic communication from point-of-sale to the system's central computer. The data center stores positive and negative files concerning consumer accounts thereby providing accurate inquiry responses regarding the current posting status of a consumer's banking account and signaling the system subscriber that said account may be reasonably relied upon for consummating a Transaction Event (i.e., an "Approval") or, here listed as delinquent, indicating that the account may not be so relied upon (i.e., a "Denial"). The system also contemplates "On-Line" services that would also permit Fund Verification.

Check Replacement

This capability operates as an extension of Authorization enabling the system subscriber the capability of completing a Transaction Event by electronically logging the sale whereupon a Transaction Event slip will be printed or manually prepared for consumer execution at the point-of-sale. By execution of the Transaction Event Slip, the consumer authorizes the electronic processing of funds secured in his/her authorized banking count in lieu of the more traditional method of issuing personal and business checks. Funding settlement to the system subscriber would be effectuated by means of Electronic Funds Transfer via ACH, the Federal Reserve system or other competing facility as opposed to physically processing and transferring checks among banks. If preferred or requested by the subscribing merchant, the present invention would further allow for a consumer's check to be written and thereafter voided, canceled, and returned to the consumer, or, in the alternate, submitted to lock box or similar storage facilities.

Bank Transaction Card

As part of this invention an "Off-Line" Debit Card is established on which is stored the information relating to the banking account from which funds representing the Transaction Event would be debited for payment to the system subscriber. This information may be stored on the card itself in encrypted or unencrypted form or may be stored in the central computer where access to such information is gained via special control characters or access codes stored on the card. Electronic authorization for withdrawal of funds from the cardholder's account and subsequent electronic settlement procedures remain essentially identical to processing under the Check Replacement service described above. Information relating to the consumer-cardholder and the appropriate banking account to be debited for a Transaction Event will be encoded upon the Magnetic stripe portion of the plastic, and terminal-readable, card. The present invention is also compatible with SMART card technology.

Thus, the overall objective of the present invention is to provide and support an alternate means for consumer payments for goods and services that operates to replace commercial bank drafts in the point-of-sale environment. Simultaneously, the present invention assures consumers greater access to and use of funds in personal or corporate banking accounts. Further, the system provides system subscribers a significantly improved prospect of collecting the underlying monies for Transaction Events, reduced time for collecting the cash receipts from Transaction Events, and a pronounced lowering of the present cost of cumbersome procedures otherwise mandated by the existing mechanisms for accepting and processing commercial bank drafts.

A further objective of the present invention is to significantly reduce the use of checks as negotiable instruments in effecting the purchases of goods or services and to provide the system's Electronic Checking Service as an equitable alternative for the consumers reliance on credit cards or cash.

DETAILED DESCRIPTION OF THE PREFERRED EMBODIMENT

The method of the present invention begins with the electronic capturing of consumer information at a system subscriber's location using a point-of-sale terminal and related equipment. This information is obtained in the presence of the consumer and occurs prior to any "Approval" for the Transaction Event or for the ultimate crediting of the System subscriber's designated depository account.

A Transaction Event involves a series of events initiating with a system subscriber's intent to sell goods or services, the payment for which would be finds secured in a consumer's banking account. The consumer's banking account status would first be verified by accessing the central computer files of the present invention. Verification is performed by use of an encoded, magnetic stripe card, where presented by the consumer or by input of account numbers from a consumer's specimen check. The present invention also contemplates compatibility with "SMART card" technology, whereby a consumers "ChequeMark Card" information might co-exists with other consumer data or payment options for alternate verification purposes. In addition to verifying a consumer's account, a more traditional identification of the consumer could also occur including visual examination of driver's license or similar and acceptable picture "ID", however, this is not considered part of the present invention.

For improved identification, security, and fraud purposes, the system is further capable of receiving input of a consumer's Social Security Number and retaining the same for use in the approval and settlement processes. The present invention is also capable of validating a Social Security Number, screening out those numbers issued to individuals reported as deceased, and cross-searching the "known" ("Positive") checkwriter database to verify the status of all banking accounts. Cross-searching is seeking a match of the Social Security Number with any over account on which there is a return, including the account which is the subject of the current inquiry. If preferred or requested by either a subscribing merchant or the affected consumer, the consumer's check could be written and, subsequent to processing through the system of the present invention, marked as "Voided" or "Electronically Settled" and returned to the consumer. In the alternative, the consumer's check may be submitted to a lock box or other storage facility.

As an integral portion of each Transaction Event, the system subscriber's location, date and time, and requested sale amount is automatically logged into the system when a system subscriber first accesses the invention. Finally, a Transaction Event Slip ("Sales Slip") will be produced by a printer integral to the point-of-sale terminal and will be executed by the consumer in the amount of the stated purchase with inscribed language defining the Transaction Event and specifically providing consumer authorization for electronic access to his/her banking account. The consumer's specimen check is returned unused or, where written, is returned to the consumer as a receipt. Thereafter, the consumer account will be debited and the proceeds credited to the system subscriber's designated depository account along with all other similar Transaction Events representing the total of the system subscriber's daily activity. Debiting of consumer accounts and settlement deposits to each system subscriber is performed by means of Off-Line electronic funds transfer through and by the ACH or Federal Reserve System. Other competing facilities such as, but not limited to, ECCHO, Cactus Switch, First Tennessee Bank, regional networks, or the VISA network, could also utilized by the present system. The system has the further ability to convert settlement processing to an "On-Line" format which would involve services such as "Funds Verification" (Authorization) or "Reserving of Available Funds" or a combination of both.

Equipment Configuration

The present invention can operate with nearly every conceivable point-of-sale equipment system. The central computer system accepts data transmitted from the system subscriber's existing point-of-sale equipment or that which is added to augment service performance. The point of sale terminal of the present invention is implemented in a number of ways, most preferred, however, being activated under a fully automated format. Such a fully automated system generally comprises a dual-port terminal with magnetic stripe reading capabilities interfaced with a logging printer capable of providing individual Transaction Event Slips for consumer execution, and a MICR check reader, optical character recognition ("OCR") equipment, or other device. It is contemplated that services may also in the future be administered using the present invention with a singular point-of-sale hardware device which, as a function of its design, would incorporate all or most of the service capabilities of an integrated terminal, logging printer, and MICR Check Reading device. The present invention also anticipates supporting existing point-of-sale equipment primarily dedicated to bankcard ("credit card") processing and other equipment. Therefore, service subscriber activations may be supported under numerous means of access from the pointof-sale. For example, personal computers and electronic cash registers in addition to variations of the more traditional stand alone transaction processing equipment including alternate POS terminal processing equipment such as International VeriFACT and Hypercom, among others, are contemplated for use by the present invention.

Additionally, the present invention can be interfaced with network computers, commonly referred to as "NC's". NC's are lower end computers for the limited use of Internet access which are easily adapted for POS Electronic Checking and other money transfers anticipated by the present invention.

Communications links from point-of-sale terminals to the central computer of the present invention will typically be in the form of telephonic network communications over a public switched telephone network ("PSTN") or over other approved networks. Internet access is also supported by the present system where access is deployed at a merchant POS for consumer payments. Internet access may also be utilized to process Electronic Checking inquiries from points other than the POS to conduct Transaction Events under the present invention between the merchant and the consumer as a merchant-initiated payment option. As the use of personal computers become more prevalent at the POS, utilization of the Internet to interconnect for approvals and capture for settlement of Electronic Checking events between a system subscriber and an affected consumer will become more routine. Transaction Event verification will occur as a result of point-of-sale terminal access to the Central computer's positive and/or negative data files. "Approved" or "Declined" notifications are returned to the "Point-of-Sale" device over the PSTN. All data files will be centrally located and maintained on the invention's central computer databases. Portions of the database include, but are not limited to, third party data files such as the Shared Check Authorization Network ("SCAN") (trademark) database.

Individual transactions or groupings of transactions are first approved by soliciting an "Authorization" prior to capturing a Transaction Event for electronic funds transfer. To maintain an accurate status of file information for authorizations to subscribing merchants, businesses, and/or individuals, the system is comprised of three separate but interactive databases, including a "Merchant," "Checkwriter," and "Transaction" database, which are continuously maintained. The "Merchant" database stores records of all service subscribers authorized to initiate Electronic Checking requests. These records include, amongst others, authorization and initiation codes, as well as the system subscriber's name and address. The "Checkwriter" database is a database of "Known" users. This database stores information that includes, amongst others, a status field indicating whether the Checkwriter would be "Approved" or "Declined." Previously unseen Checkwriter MICR strings, when "Approved", are also added to the "Checkwriter" database for future inquiries to the system. The "Transaction" database processes inquiries as well as stores the transaction records of "Approved" responses for formatting and electronic settlement through the ACH or similar facility. Current card holder or checkwriting records are updated daily and instantly available for point-of-sale inquiry for Transaction Event authorizations.

System subscribers point-of-sale equipment is interfaced to the central computer of the present invention by means of a telephonic network which is able to support communication from a plurality of point-of-sale terminals. Programming of the point-of-sale terminal causes an automatic 'Dial-Up" to the central computer and provides an automatic query and response sequence affirming or denying the Transaction Event. Each Transaction Event which is "Approved" is captured for electronic settlement within the transaction database log of the present system. The addition of local entry hubs may be installed to better facilitate the speed or economics of communications with the data files. Alternatively, the use of satellite or cellular communications or enhanced radio transmissions instead of telephonic networks may also be used. Similarly, the system's data files and associated Check Replacement Service are contemplated to be responsive to emerging point-of-sale devices intended to seek authorizations and/or improved consumer identification and security by the alternate means of voice pattern recognition, POS fingerprint identification, retina scan, geometrics, biometrics, "smart" chips, consumer or check imaging and/or signature broadcasting. The present system further contemplates use of imaging technology as an enhancement to facilitate POS consumer identification and electronic settlement for "Approved" Transaction Events. Imaging technology comprises capturing an impression of a consumer's check or a "signature capture" followed by electronic settlement of the consumer's account.

The present system further comprises extensive system approval and fraud prevention capabilities. The system processes Transaction Events under a variety of different service types, each defined at the discretion of the system subscriber. The resulting flexibility enables the merchant to respond to his/her relative "comfort level" with a particular Transaction Event or consumer. Typical service types include (i) "Access Only" wherein the inquiry bypasses the present system's approval criteria but the Transaction Event, including all consumer account information, is automatically captured and logged within the transaction database for an electronic settlement attempt; (ii) "Check Replacement" which seeks the systems transaction "approval" and, where "Approved", captures the Transaction Event for electronic settlement; (iii) "Card Acceptance" which operates in a manner virtually identical to "Check Replacement" as mentioned above, but the Transactions Event is activated through the use of an encoded card (versus a specimen check); or (iv) "Authorization Only" which seeks the system's approval providing a system subscriber information regarding the reliability of a subject consumers account, but does not capture the Transaction Event for electronic settlement. In the "Access Only"service type, "Access Only" events bypass the database records and all other approval and search criteria such as those explained below, e.g., velocity controls, social security checks, and scans. It is contemplated that these "Access Only" events always be "Approved" and passed immediately to a settlement log for an attempted consumer debit and service subscriber credit.

The present invention has the additional capability to use a consumer's Social Security Number to perform a variety of identification and fraud preventative applications prior to issuing an "Approved" message for the Transaction Event. These include searches employing Social Security Number first to validate the consumer's Social Security Number as a genuinely issued number. Second, the system cross searches the system's "Dead File" to screen out Social Security Numbers which, while validly issued, were issued to individuals now reported as deceased. To a greater extent, verification and "Dead File" searches deter access by consumers attempting to use false identification. Lastly, the present system utilizes Social Security Numbers to cross search all "Known" checkwriter banking account records for negative information before issuing an "Approved" message for the subject Transaction Event. This capability more fully insulates the system and its system subscribers from abuse and susceptibility to repeat abusers who would commonly seek to process Transaction Events from a multiplicity of banking accounts.

Entry of a consumer's Social Security Number is performed by input of the number from the keypad of a POS terminal used to process Transaction Events. Alternately, the system also supports the use of a pinpad or similar device, interfaced with the POS terminal, for consumer entry of a Social Security Number. This capability supports a consumer's preference for complete privacy as to the entry of pertinent information. Consumers accessing the system by means of a previously issued encoded card will have already logged their Social Security Numbers onto the system's database, and, therefore, would not be required to re-enter their Social Security Numbers or other pertinent information.

The present invention is also equipped with velocity controls which regulate approvals within prescribed purchase limits imposed upon either the system subscriber or a consumer. The present invention has the further flexibility to differentiate between "first time" consumer usage and those limits otherwise assigned to "known" consumer accounts. Merchant variations in velocity limits can also be imposed depending upon the type, nature, and consumer purchasing statistics for a particular merchant category or location.

Inquiries seeking an "Approved" response for a Transaction Event which meets all other criteria of the system's approval process, including velocity controls, and when involving previously unknown banking accounts but carrying verified Social Security Numbers which have revealed no negative information following a cross search of the database and where the numbers are also not entries in the "Dead File", are "Approved". Consequently, each consumer's banking account and Social Security Number, along with other information, is automatically logged into the "Known" checkwriter database of the present invention at the time the "Approved" response is transmitted to the inquiring POS terminal. In addition to other identification and fraud preventative measures, the system's access to Social Security Numbers significantly improves settlement features relating to matters of proper authority when "Approved" and captured Transaction Events are transmitted to the consumer's financial institution for settlement in the form of electronic debit and credit notations.

The system further contemplates other fraud and enhanced identification capabilities. These include, but are not limited to, reliance upon such evolving technologies as fingerprint capture and analysis, signature capture and verification, imaging technology, retina scan, biometrics, and other forms or manners of improved identification practices as such either currently exist or as such may, upon further development, be readily integrated in to the system of the present invention.

BRIEF DESCRIPTION OF THE DRAWINGS

FIG. 1—System overview of the present invention
FIG. 2—The point-of-sale equipment
FIG. 3—The Central Computer System
FIGS. 4–7—The Process Data Flow
FIG. 8—transaction Event Sales Slip
FIG. 9—manual Transaction Event Sales Slip

DEFINITIONS

For purposes of the description and claims relative to the system of the present invention, the following terms shall have the meanings set forth below. The following definitions are applied throughout this application.

Card Acceptance:

A service sponsored by the present invention which enables an encoded card to be utilized to access the central computer and thereby denote the subject consumer banking account to be electronically debited in a point-of-sale Transaction Event.

Authorization Only:

A service made available under the present invention as a convenience to its service subscribers where the subscriber can verify the current status of the subject consumer's account. In the preferred embodiment, these events are not captured for electronic settlement.

Check Replacement Service:

This is a service sponsored by the present invention which enables a consumer's specimen ("paper") check to be utilized to access the central computer of the present system thereby denoting the consumer banking account to be electronically captured and settled by presenting a debit notation through the facilities of the ACH, or other competing service, for a purchase conducted from a system subscriber's point-of-sale.

Access Only:

This is a service sponsored by the present invention which enables a consumer's specimen ("paper") check to be utilized to access the central computer of the system thereby denoting the consumer banking account to be electronically captured and settled by presenting a debit notation through the facilities of the ACH, or other competing service, for a purchase conducted from a system subscriber's point-of-sale.

Electronic Checking:

This is a service sponsored by the present invention which collectively enables a system subscriber to electronically debit funds from the consumer's bank account and credit to those funds to the system subscriber's account utilizing various transaction methods and banking rules as envisioned above.

DESCRIPTION OF THE PRESENT INVENTION

Figure 1:
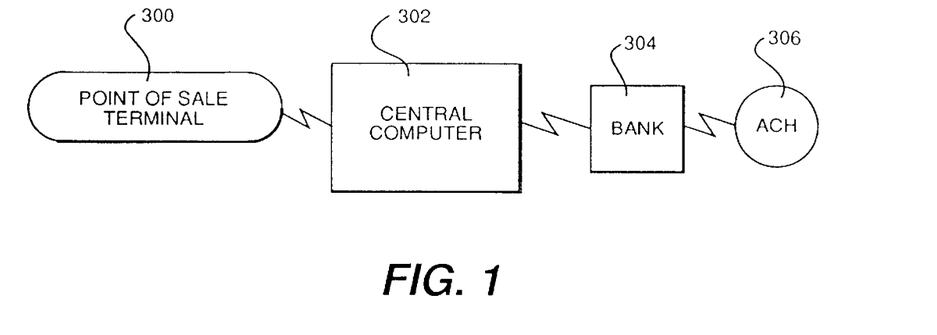

Referring to FIG. 1 an overall schematic of the present invention is described. Point-of-sale terminals 300 communicate over normal PSTN telephone lines with a central computer system 302 which in turn communicates with a Banking institution 304 for purposes of debiting consumer accounts and crediting system subscriber accounts. The banking institution performs its function via normal automated clearing house ("ACH") transactions 306 or other competing facility as mentioned above. Alternatively, the system can automatically generate preauthorized drafts to debit consumer checking accounts where more expeditious in settling a particular Transaction_Event. This manner of settlement particularly addresses the "first-time" consumer whose account might otherwise require pre-notification preceding the processing of a "live" debit event. Pre-notification is to become volitional in 1996 which, when effective, will minimize the present system's reliance upon or use of drafts as a mechanism for settling consumer payment requests.

Figure 2:
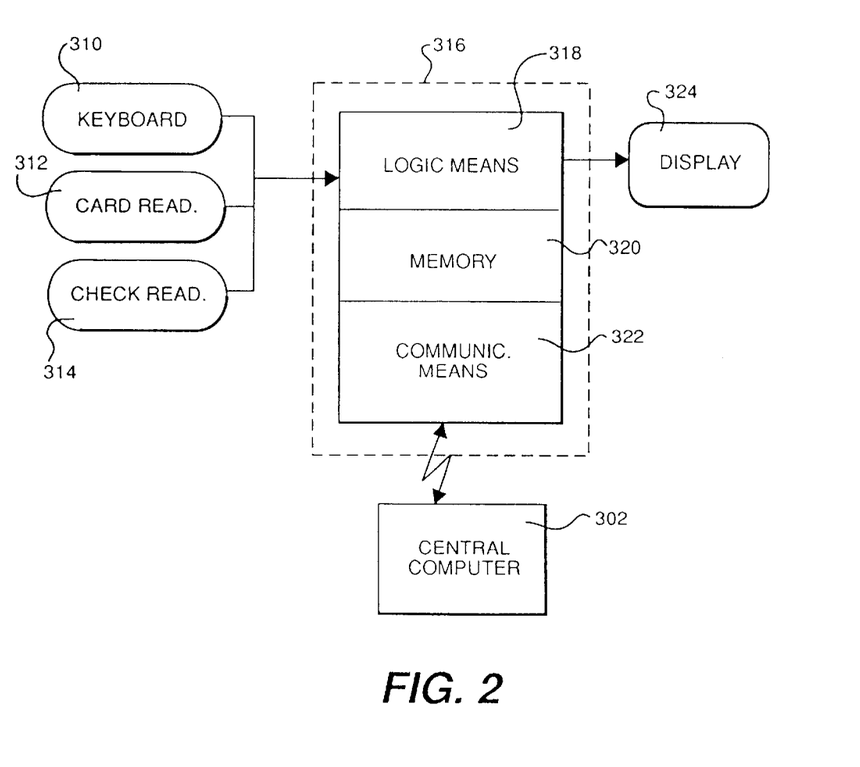

Referring to FIG. 2 the point-of-sale equipment is described. The point-of-sale terminal comprises several different entry means. A key board 310 can be used to input consumer information manually, including both bank routing and consumer account information. The key board 310 allows the system subscriber to input information such as (i) electronic checking requests, (ii) a void procedure for incorrect, returned, or canceled events, (iii) a preauthorization inquiry for the status of consumer accounts, and (iv) accessing system subscriber's daily activity reports. Alternatively a card reader 312 can be used whereby the magnetic strip on the card is read by the point-of-sale terminal to obtain account information and finally a check reader 314 may alternately be included to read the MICR encoded bank and account numbers which appear on a consumer's specimen check as a substitute for either a specific card or key board input. These various input means provide information to a microprocessor 316 which comprises logic means 318, memory means 320, and communication means 322. The logic means 318 comprises logic which allows the information received from the various input means to be processed and stored in the memory 320. The logic means further drives a display 324 which provides a visual output of the bank and account numbers of the consumer for verification. The communication means 322 allows the subscriber terminal to communicate with the central computer 302 for purposes of processing the consumer's purchase. The communications means 322 is compatible with ECR and PC systems.

Figure 3:
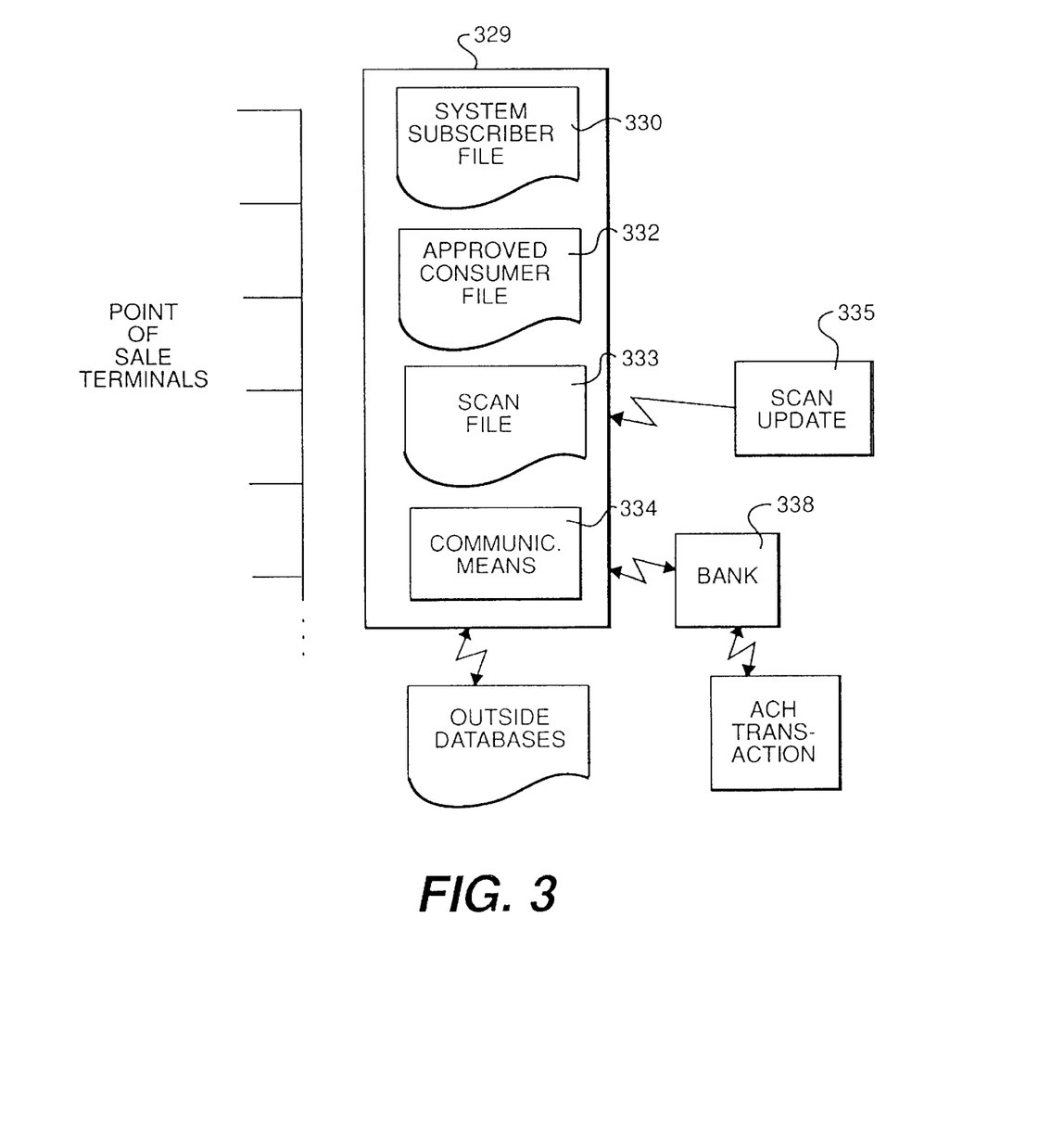

Referring to FIG. 3 the central computer system 329 is described. The central computer system receives input from a plurality of point-of-sale terminals which provide transaction information from a system subscriber and a consumer desiring to purchase goods or services. The central computer system comprises a system subscriber 330 file which is a file of those merchants who have elected to use the present invention for processing purchases. The system subscriber 330 comprises the "Merchant" database which, as previously stated, stores records of all service subscribers authorized to initiate Electronic Checking requests, including authorization and initiation codes, and the system subscriber's name and address. The central system also comprises known consumer file 332 which stores the account information and names of those consumers who have already been approved for purchases to take place through various input means. The consumer file 332 comprises "Checkwriter" database. Additional databases are relied upon by the system which assist in approving consumer Transaction Events including, but not limited to, the SCAN (Trademark) database, MOD-10 verification, Social Security Number database, and other proprietary screening criteria which serve to approve, decline, or reject, the latter serving to cancel those inquiries which are inaccurate, incomplete, or contain fraudulent data received by the central computer. The "Transaction" database is another such database provided by the system.

The system of the present invention further comprises a third database defined as a transaction database which stores all activity that is conducted between the plurality of terminals and the central terminals. Those inquiries captured for a settlement attempt are converted by the system for ACH file for preparation and settlement. Inquiries either "DECLINED" or for various reasons rejected are similarly retained by the transaction database. The "DECLINED" or other rejected inquiries are withheld from transfer for settlement.

The computer system also comprises a communications means 334. The communication means is capable of communicating with other external, third party databases to allow the system access to review additional negative records regarding the consumers' banking account prior to issuing an "Approved" response. Once an "Approved" response is given for a Transaction Event involving a consumer banking account previously unknown to the system, the newly "Approved" consumer record is automatically added to the system's checkwriter database. This new record allows for the entry of the consumer's new address and phone number information.

As presently configured the central computer 329 already houses the third party database known as the SCAN (trademark) database 333 resident on the central computer. Thus credit worthiness can be checked using all current database criteria searches, and further benefit by immediate access to the records from the SCAN (trademark) database. All databases, including proprietary databases and SCAN (trademark) databases, are updated daily.

The communication means 334 also transmits ACH files which are created by the system and communicated with a banking institution 338, including instructions for the bank to debit the account of the consumer and credit the account of the system subscriber (merchant), with the amount of the purchase. These transactions are then settled via the "Off-Line" ACH transaction process. The system of the present invention also contemplates the use of "On-Line" settlements.

Figure 4:
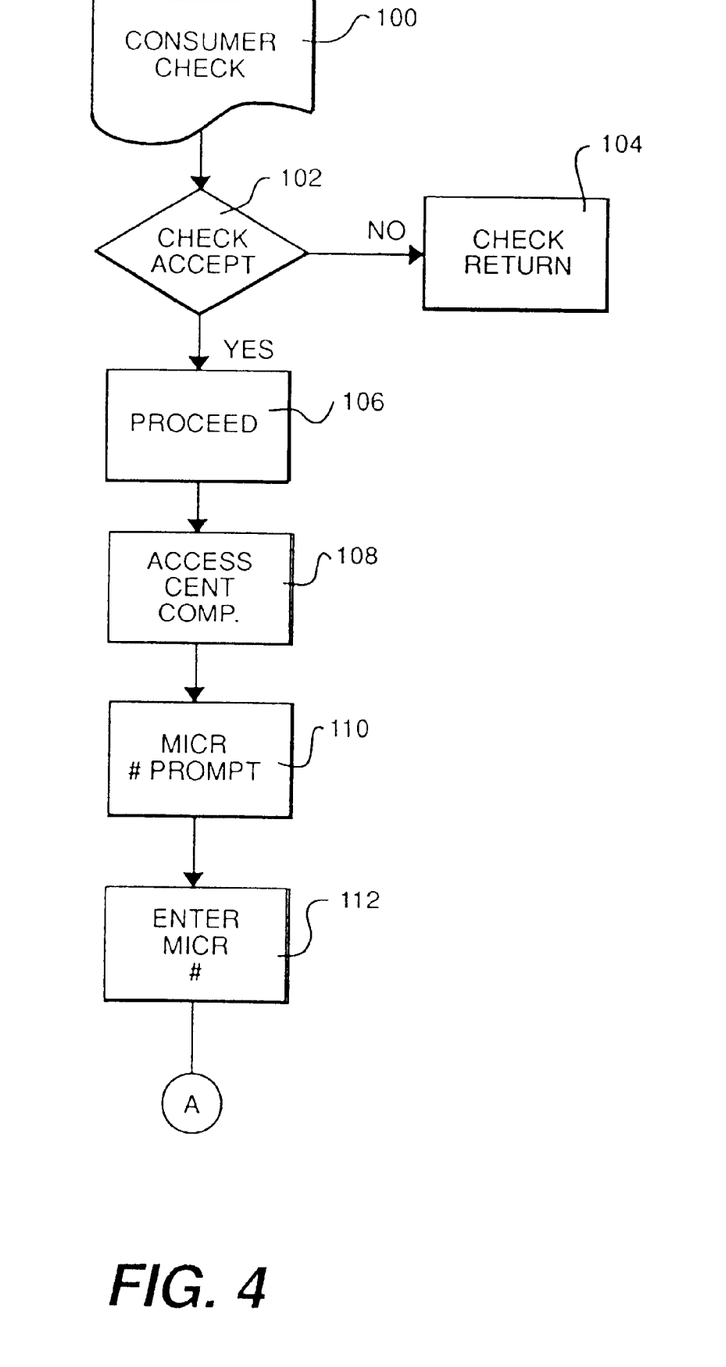

Referring to FIG. 4 the process begins by a consumer presenting an encoded card or a specimen or "blank" check complete with MICR number to the system subscriber (the merchant) 100. The subscriber begins the process by first pressing the appropriate key on a terminal to select a particular service prior to accessing the host computer 108. Thereafter the point of sale terminal prompts the system subscriber to enter the appropriate MICR number 110. The system subscriber then enters the appropriate MICR number either manually or by passing the card through a magnetic stripe reader on the terminal or the specimen check through a check reader which determines the consumer's bank and account numbers 112.

Figure 6:
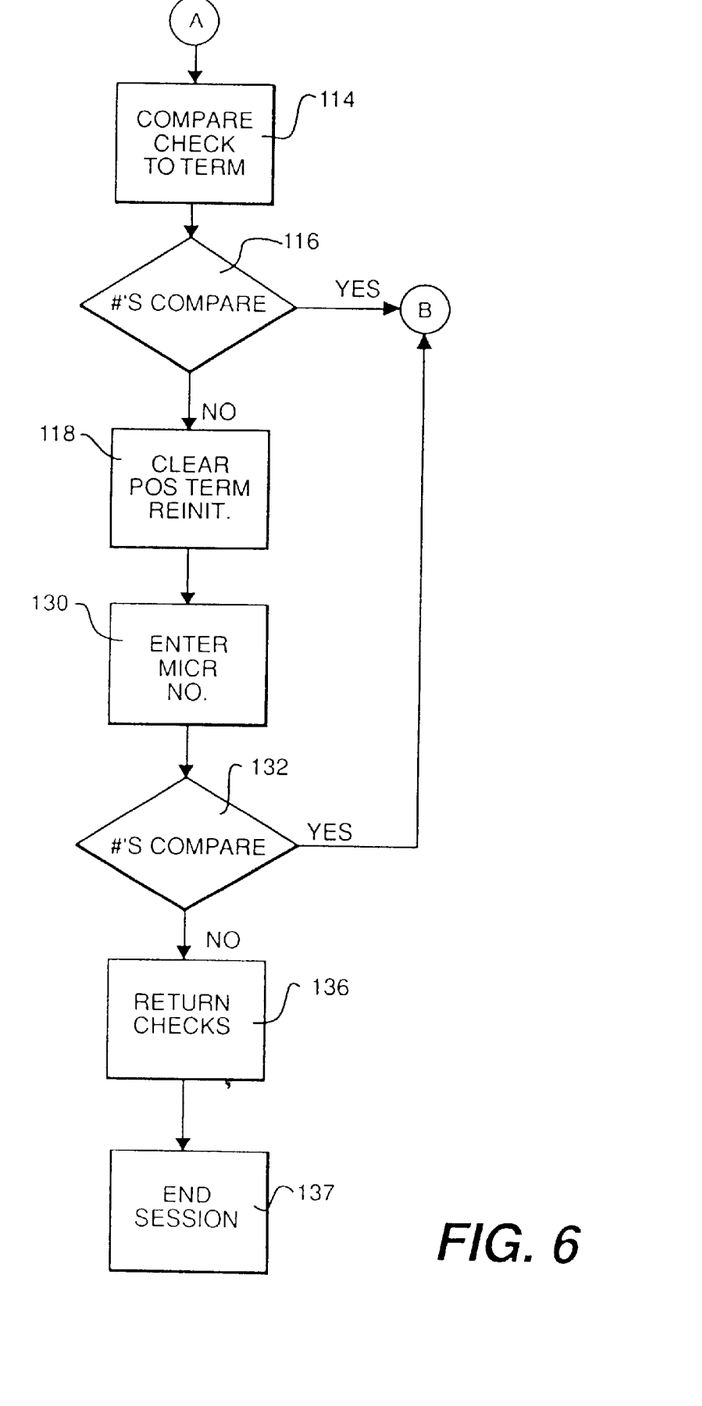

Referring to FIG. 6 the subscriber would verify that the numbers appearing on the terminal's display screen match the numbers on the encoded card or the MICR numbers on a consumer's check 114. If the numbers do not compare with that of the terminal the system subscriber clears the terminal and begins the transaction process again 118. If the process is to be reinitiated, the subscriber enters the MICR or card number(s) into the point of sale terminal 130. Thereafter the system subscriber compares the numbers as before 132. If the numbers compare to the system display 134 the process proceeds. If the numbers do not compare 136 the check or card is returned to the consumer and the process terminates 137.

Upon a successful reading of a consumer's specimen check, the check is number embedded thereon id also captured and, once communicated to the System Central Computer, retained for future reference purposes or security matters, such as consumer inquiries or verification of proper authority. Access to the check number proves critical when performing a sequence review to resolve such matters.

Figure 5:
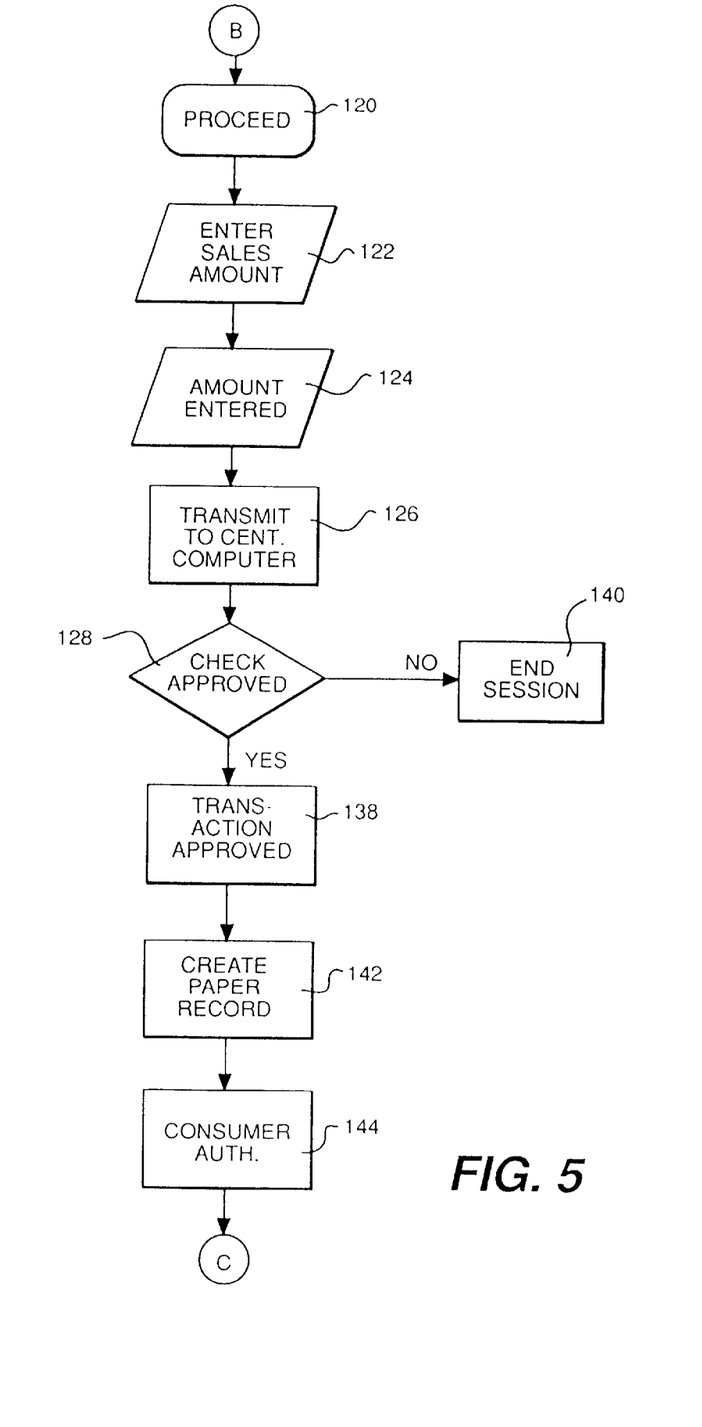

Referring to FIG. 5, if the verification process proceeds, the terminal next prompts the system subscriber to enter the amount of the sale 122 and other security or identification information required. The subscriber enters the amount of the sale along with requested information 124 and the terminal thereafter transmits an inquiry to the host database for verification 126.

The check or card approval process next takes place 128. If the inquiry is not approved by the central computer the terminal displays a message declining or rejecting the transaction 140. Thereafter, printer record of the declined or rejected transaction is made for purposes of the system subscriber 142 to comply with the Fair Credit Reporting Act and Regulation of the Board of Governors of the Federal Reserve System.

If the card or check is approved, the terminal displays a message noting the approval 138 and the specimen card or check is returned to the consumer. The printer further makes a paper record of the transaction 142 and the consumer places any required information on the paper receipt and signs the receipt expressly authorizing the transaction 144. At the election of the system subscriber, or at the request of the consumer, the consumer may write s the check which would then be stamped "Void" or "Electronically Settled" and thereafter returned to the consumer or submitted to lock box or other storage facilities. This procedure is used for security measures or where fraud and/or database searches (which rely on the cancellation of a specimen check) are contemplated.

Figure 7:
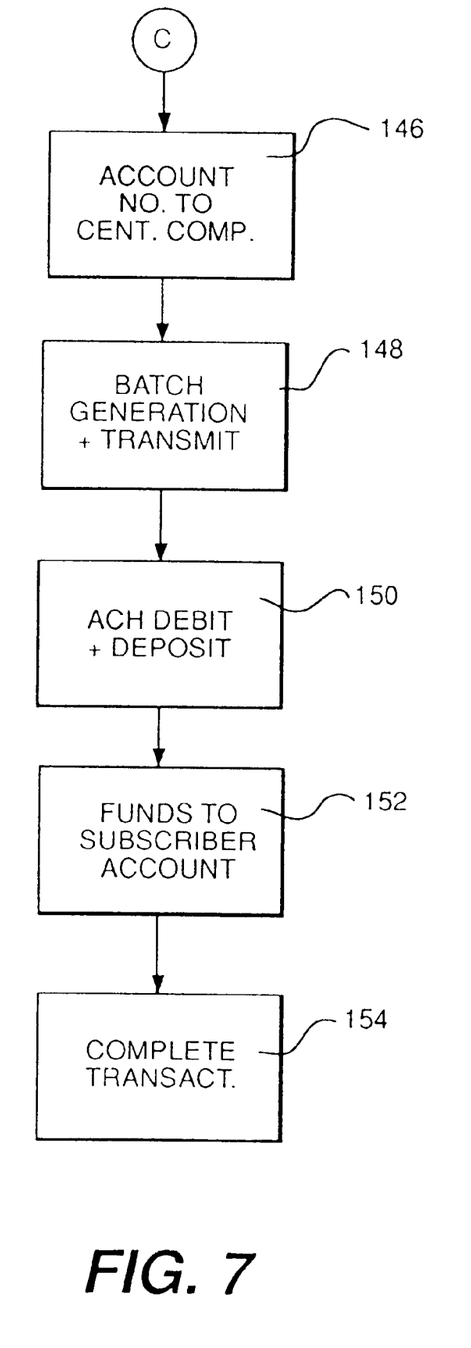

Referring to FIG. 7, the process description continues. Once the transaction is "Approved", the central computer makes a record of the MICR information and other data captured at the point-of-sale, including the sale amount, permanently storing all the information 146. Upon closeout of a terminal's batch of daily Transaction Events by a system subscriber, the system's central computer reformats the captured activity within its transaction database to ACH format and thereafter, at regular intervals, transmits all of the daily batch activity for every system subscriber into the ACH network as debit and credit notations. The central computer subsequently generates a batch message regarding all Transaction Events for the prior period and transmits all the Transaction Event information for the day into the ACH network 148.

During the ACH process each Checkwriter's account is debited for the exact purchase amount 150. Thereafter, collected funds representing the total of a day's activity, being the aggregate of all Transaction Events processed for consumers by the system subscriber, are deposited into a subscriber's designated account 152. The transaction is then complete 154.

How to Use

The present invention will require the establishment and maintenance of three interconnected but separate data files for the purpose of performing access searches. The system embodied by the present invention, and the interactive databases comprising the system, are accessible by dial-up communication procedures from point-of-sale ("POS") terminal devices, electronic cash registers, and/or personal computers similar to the equipment utilized in the processing of automated bankcard ("credit card") receipts. The terminal prompts an operator/user to process one of four optional inquiry types. Any one or all of four primary functions are capable of being performed at a single point-of-sale terminal within the control of the system subscriber. The inquiry types and database responses for "Approved" Transaction Events are as follows:

Card Acceptance

Having depressed the assigned key and thereafter being prompted, the system subscriber "slides" an encoded magnetic stripped transaction card through the point-of-sale terminal and enters the "Sale Amount" requested for authorization. Thereupon, the termiinal's dial-up capabilities direct the inquiry to the central computer for authorization against "KNOWN" (Positive and Negative" file of current cardholders). Inquiries where a "POSITIVE" "Match" are found and where the cardholders' status fields are listed in "good standing" cause an "Approved" return message from the data file to the inquiring POS terminal. In order to accomplish this the present invention's database captures each new MICR string for future reference. Embedded within the data record is a notation identifying the "Status" for that account. In this manner, if a certain signal is generated, for instance a "Y", then the account would be "Approved" for future access to the system. Conversely, a "No-Match" to inquiry or a "Match" where the cardholder's status field were listed in "bad standing" would result in a "Declined" notice to the POS terminal. Daily input to the system for the present invention causes automatic updating of status fields for all cardholder files including the activation of new cardholder accounts, the placement of corrective status entries ("Positive" or "Negative") into the status of existing cardholder files, deletion of terminated accounts or to change other file status in existing accounts. In the case of a "NoMatch" the system of the present invention would generate a different signal such as a "No" and the "Account would be "Declined" upon an attempt to access the system.

Authorization Only

Having depressed the assigned key and thereafter being prompted, the system, subscriber manually enters account numbers from a personal or business check or, where fully automated, enters a specimen check through a MICR Check Reader device interfaced with the terminal, whereupon the terminal's screen would display the check's bank and account numbers for verification. Thereafter, the operator would enter the "Sale Amount" and other security or identification information requested for authorization. The terminal's dial-up capabilities then direct the inquiry to the computer data file center for authorization first against the "Known" file of checkwriting records whereupon the current status field is verified. A successful "Match" to an inquiry, where the current status field lists the checkwriter record as in "good standing", would result in an "Approved" notice from the central computer to the inquiring terminal. Conversely, a successful "Match" to an inquiry, where the current status field lists the checkwriter record as not in "good standing", would result in a "Declined" notice from the central computer ti the inquiring POS terminal. Each inquiry preliminarily resulting in a "No-Match" (first time user) when processed against the system's "Known" checkwriter's database would then be passed through any and all available third party databases which reside on or are available to the system by external link preceding any return notice to the inquiring terminal. This third file is anticipated to be the Shared Check Authorization Network ("SCAN") a negative database currently maintained in the system computer data file center or other databases.

Check Replacement Service

Inquiries initiated as Checked Replacement inquiries are first processed through the system's "Known" checkwriter database and, as necessary, thereafter proceed to the SCAN database, or other database files, prior to the issuance of an "Approved", "Declined", or a rejection message to the inquiring POS terminal. A "Match" in the system's checkwriter database records indicates a consumer account which is "Known" to the system. If a "Match" is found and where the checkwriter's status field within the database is listed in "good standing", an "Approved" response results. Conversely, a "Match" where the checkwriter's status field were listed in "bad standing" would result in a "Declined" notice. Reliance upon account information available from SCAN or any other positive or negative databases minimizes the risk associated with the system's approval of Transaction Events involving consumer accounts which are previously "Unknown" to the invention's proprietary "Known" checkwriter database. A Match" in the SCAN "NEGATIVE" file would result in a "Declined" response to the inquiring terminal. Where a "No Match" should occur, and subject to the receipt of no other negative information received from the system criteria searches or from alternate databases, the event would be "Approved" as a "first-time" consumer user. Negative information received from SCAN or the rejection of the Transaction Event for other reasons would result in a "Declined" or one of various reject responses to the POS terminal. Daily input to the system of the present invention causes automatic updating of all checkwriter records and the placement of corrective entries ("Positive" or "Negative") into the status fields of existing checkwriter files. Each newly captured, but previously "Unknown" accounts, would, subsequent to an "Approved" notice, be automatically entered into the system's "Known" checkwriter file. Check Replacement Transaction Events are captured by the system and logged within its transaction database. The total of daily, "Approved" Transaction Events are "paperless" sales whereby the service subscribing merchant has submitted requests for electronic debit via the ACH network, or other competing facilities for each such authorized consumer purchase. Commercial bank drafts ("paper" checks) are not accepted or processed by the service subscriber. For each "Approved" Transaction Event, a "Sales Receipt" is manually prepared or is automatically printed at the point-of-sale. The consumer provides express authorization for an electronic debit by signing individual sales receipts.

Access Only

Access Only Transaction Events are processed in essentially the same manner as Check Replacement events with one significant variance. Access Only events bypass the authorization criteria within the system's central computers established for approving Check Replacement events and are automatically captured within the system's transaction database for a settlement attempt. All other functionality aspects of an Access Only and a Check Replacement Transaction Event remain identical.

All terminal programming and all prompt strings for MICR Check Reader interfacing are stored in the POS terminal and the computer center of the present invention controls interactions between the plurality of terminals and the central system. The following modules are present.

Programming for POS Equipment Interface system subscriber locations to be activated with the present invention must possess or acquire a Tranz (trademark) 330 or higher grade terminal or alternate terminals, personal computers, or approved electronic cash registers supporting interface capabilities with a MICR check reader.

The MICR check reader interface results in the reading and transmitting to a terminal, in accepted format, of the consumer's entire ABA/Transit, checking account, and specific check number information which when combined with other data keyed directly into the terminal results in a query to the system's central computers. Subsequent to a terminals receipt of the banking account numbers, the termiinal's will display the numbers on its screen allowing the operator to verify the accuracy of the captured "read" prior to proceeding. If the consumer's account numbers are correct, the Transaction Event may proceed, or, where incorrect, the operator can "clear" the event and resubmit the consumer's specimen check through the check reader. Alternately, the consumer's bank and account numbers and other requested information may be manually entered directly into the terminal with all other financial and operational advantages of the present invention remaining in effect.

The computer data file center receives and processes Transaction Event authorization requests utilizing the entire MICR string for accurate, error-free identification of both the consumer bank and a specific checking or depository account to participate in a sale. ACH settlement criteria mandate exact recall for the bank and checking account numbers to properly complete any debit request. This invention conforms to each and every requirement of the ACH transaction regulations including all pending guidelines and/or proposals and rules changes regarding processing requirements or new classification or submittal types.

The present invention assigns a unique identifier(s) for purposes of accurately identifying individual MICR accounts and Transaction Events. To this end, each new event captured on the "Checkwriter" database is consecutively assigned a unique 15 character account number, checkwriter. This unique same checkwriter identifier is thereafter printed on future receipts for subsequent transactions processed.

Additionally, upon entry of media information from one receipt, an additional code, such as a sixteenth character, is automatically assigned by the present invention. The sixteenth character indicates that the subject MICR account is "known" and "registered" on the system, thereby alleviating the need to supply a Checkwriter's name, address, and phone number on subsequent transaction receipts.

A second unique identifier is assigned to distinguish an individual Transaction Event approved by the system. For purposes of settlement, or other inquiries, this numerical identifier may be employed to recover all salient information pertaining to the Transaction Event, Checkwriter, and the service subscriber. It is also contemplated that under certain circumstances, the check number can be used in lieu of a unique identifier to effect settlement and credit of the Transaction Event Both identifiers (i.e., Checkwriter and event) are retained by the system and printed on the customer's transaction receipt. Moreover, the unique identifiers' satisfy the requirements for the preparation and submittal of electronic debit and credit notations through the ACH in conformance with Federal regulations.

Figure 8:
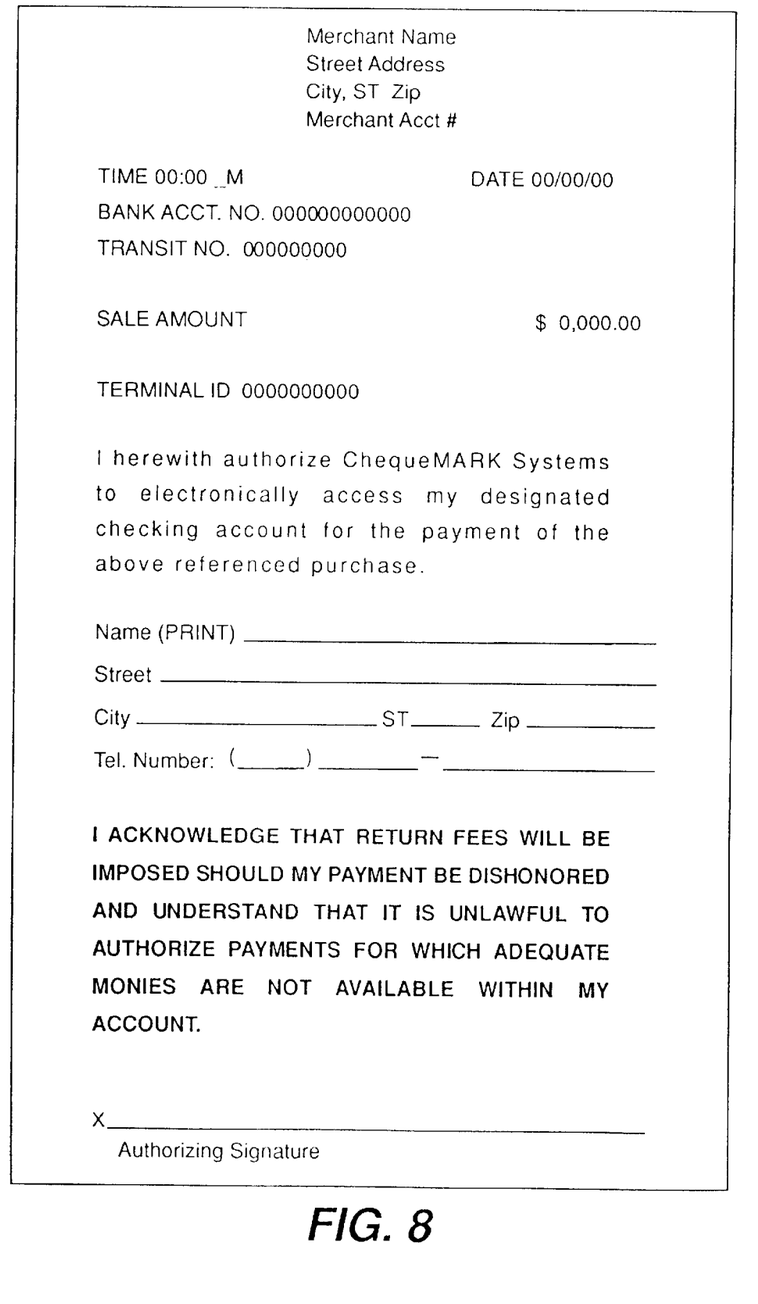
Figure 9:
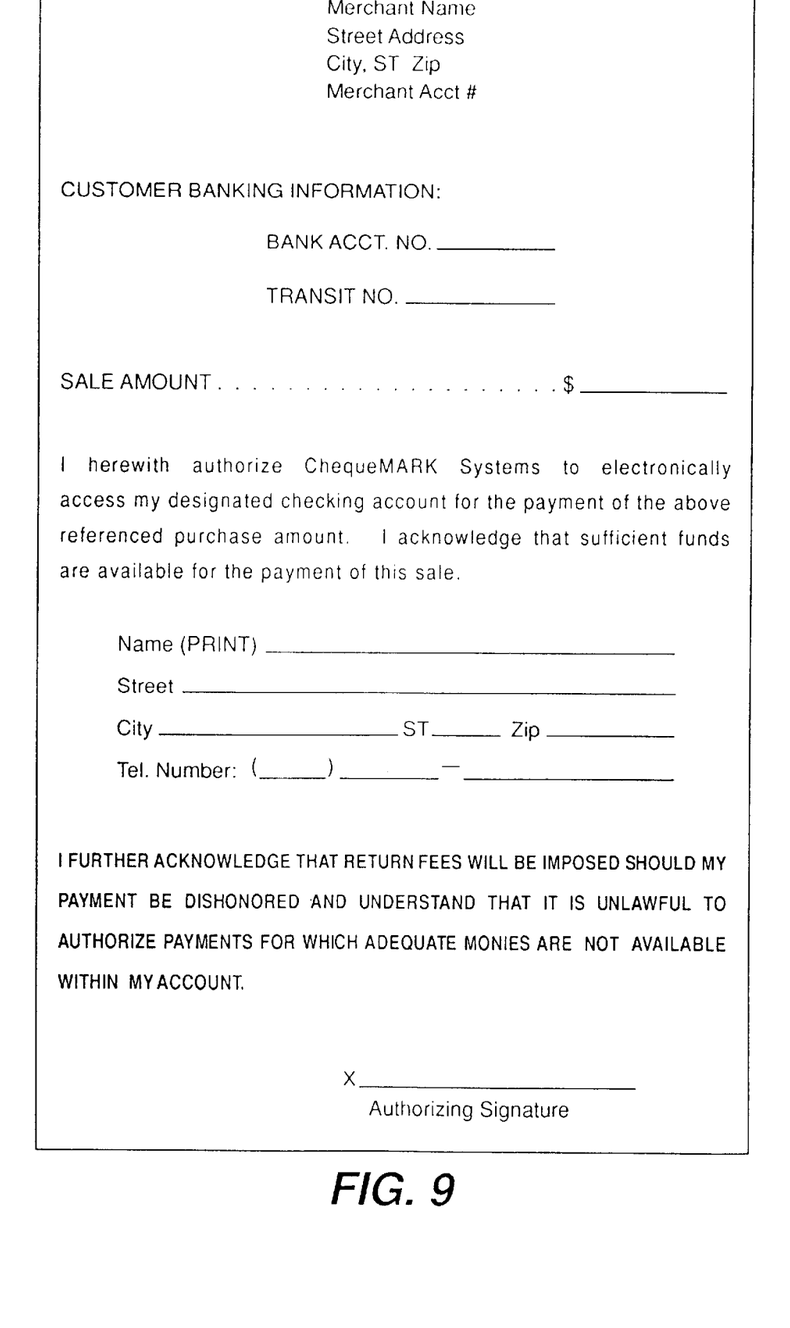

Each Transaction Event is completed with the logging printer generation of a Transaction Event ("Sales") Slip for each "Approved" authorization inquiry processed (FIG. 8). Alternatively, a manually created Transaction Event slip can also be prepared (FIG. 9). Each such Transaction Event Slip must be exacting in its retention of account numbers and the sale amount enabling both the consumer and system subscriber to be provided "hard copy" receipts of the event. Also included would be a clear printing of the transaction type; "Card Acceptance," "Authorization Only"(as appropriate), "Check Replacement," or "Access Only". Authorization language is printed immediately preceding the consumer's signature line specifically authorizing electronic access in payment of the requested transaction sale amount.

Instances will arise where previously "Approved" Transaction Events will require the operational equivalent of a "Void" or "Credit" procedure. The system of the present invention enables communication by a service subscriber with the central computers to effect such corrective adjustments to prior events. By way of example, a "Void" may be initiated by depressing the assigned key on a service subscriber's POS terminal and, once complying with security prompts, the POS terminal will thereafter communicate with the system's central computers and make such requested corrections. In the event of a "Voided" Transaction Event, a separate "Voided" slip will be automatically printed as a permanent record.

In addition to the primary functions for POS equipment programing, each POS terminal/MICR interface processing location is capable of generating printed activity reports. Activity reports can be printed in either summary or detail formats identifying all "Approved" Transaction Events by service type, approval number, and amount. Reports further provide the total number of events "Approved" and the total captured amount of consumer payments contained within the activity report. Events which were previously recorded on the system's central computers as "Approved" but which have been subsequently "Voided" are also identified, including detail of the originally "Approved" events, with the amount of such "Voided" events deleted from the activity report's total for the captured amount for all Transaction Events.

SUMMARY

A flexible, transaction processing system is described which permits point-of-sale electronic checking events to be conducted in a "paperless" manner thereby eliminating the necessity of a service subscriber accepting or processing commercial bank drafts ("paper" checks) otherwise presented by consumer's in payment for goods or services. Individual Transaction Events are submitted to the system's database for approval in an automated manner and, where "Approved", captured for electronic settlement. Thus, consumer payments initiated from a service subscriber's point-of-sale are electronically debited against the banking account of the consumer and credited to the designated depository account of the service subscriber. Among the numerous advantages of the current invention, consumers are provided access to their banking account funds, but service subscribers are no longer required to accept or process commercial bank drafts ("paper" checks). Transaction Events captured by the system are settled electronically by the submission of credit and debit notations through the facilities of the ACH network or any competing network. Departures from the proposed system, especially with respect to modifications to the system's service types or the point-of-sale equipment employed, will be apparent to those skilled in the art without departing from the spirit of the invention as described. For example, variances in service type such as "ECK," "RCK," "Check Truncations," and "Electronic Check Presentment" which enables Electronic Checking events to be processed from a merchant's point-of-sale system are also contemplated by the present invention.

What is claimed is:

1. A checkwriting point of sale system comprising:
   a point of sale terminal adapted to receive payer bank account information from any bank check;
   a central computer system;
   first communications means integral to said point of sale terminal for electronically communicating with the central computer system;
   memory means integral to said point of sale terminal for temporarily storing the payer bank account information;
   the central computer system having second communication means for receiving information from a plurality of said point of sale terminals; and
   the central computer system second communication means enabling said central computer system to communicate with external databases for performing a payer bank account status search and further enabling communication with an electronic funds transfer system for transferring funds without using the bank check as a negotiable instrument.

2. The checkwriting point of sale system of claim 1 wherein the pont of sale terminal is further adapted to print activity reports of transaction events occurring at the point of sale terminal.

3. The checkwriting point of sale system of claim 1 wherein the point of sale terminal is further adapted to annotate the bank check that is used at the point of sale terminal to provide the payer bank account information.

4. The checkwriting point of sale system of claim 1 wherein the payer is selected from the group consisting of consumers and businesses.

5. The checkwriting point of sale system of claim 1 further comprising means for service subscriber activation.

6. The checkwriting point of sale system of claim 5 wherein the service subscriber activation means is a personal computer.

7. The checkwriting point of sale system of claim 5 wherein the service subscriber activation means is an electronic cash register.

8. The checkwriting point of sale system of claim 1 further comprising means for biometrically verifying the identify of the payer connected to the point of sale terminal.

9. The checkwriting point of sale system of claim 1 further comprising a reader selected from the group consisting of MICR readers, OCR readers, magnetic stripe debit card readers, and smart card readers connected to the point of sale terminal for input of the payer's bank account information from a check or card.

10. A checkwriting point of sale process comprising:
    presenting a check to a point of sale terminal located at a merchant or service provider;
    reading a magnetic ink character recognition number information on the check for the sole purpose of obtaining consumer bank account information, without using the check as a negotiable instrument;
    storing payer bank account information obtained from the check
    providing transaction event information to the point of sale terminal;
    transmitting the transaction event information and payer bank account information to a central computer system;
    storing the transaction event information and payer banking account information; and
    transmitting the transaction event information to a bank for electronic funds transfer from the payer bank account of funds sufficient for the transaction event.

11. The checkwriting point of sale process of claim 10 further comprising disposition of the check by one of the group consisting of: returning a blank check to the payer returning an incomplete check to the payer, returning a completed and voided check to the payer, retaining an incomplete and voided check and retaining a completed and voided check.

12. The checkwriting point of sale process of claim 10 further comprising: receiving and retaining a paver's social security number or federal tax I.D. number.

13. The checkwriting point of sale process of claim 10 wherein the payer is selected from the group consisting of consumers and businesses.

14. The checkwriting point of sale process of claim 12 further comprising cross-searching a known checkwriter database to verify the status of all of the payer's banking accounts.

15. The checkwriting point of sale process of claim 14 further comprising sending an approval message to the point of sale terminal if the payer's banking account status is approved for the transaction.

16. The checkwriting point of sale process of claim 15 further comprising by-passing the approval process;
    capturing and logging the transaction event; and
    electronically settling the transaction.

17. The checkwriting point of sale process of claim 14 wherein the cross-searching further comprises conducting a "velocity check" of the payer's expenditure to avoid fraud.

18. The checkwriting point of sale process of claim 10 further comprising performing a "velocity check" on the merchant's or service provider's sales activity to avoid fraud.

19. The checkwriting point of sale system of claim 1, wherein the electronic fund transfer occurs online or offline.

20. The checkwriting point of sale system of claim 19, wherein the electronic fund transfer is by ACH or Federal Reserve system.

21. The checkwriting point of sale system of claim 1, further comprising printing means associated with said point of sale terminal for printing a transaction event slip authorizing the debit of funds from payer's bank account for payer execution.

22. The checkwriting point of sale process of claim 10, wherein the electronic fund transfer occurs online or offline.

23. The checkwriting point of sale system of claim 22, wherein the electronic fund transfer is by ACH or Federal Reserve system.

24. A checkwriting point of sale process comprising:
    a payer completing a check for a transaction with a merchant or service provider;
    using a point of sale terminal associated with said merchant or service provider to read MICR information on the check to obtain payer bank account information;
    inputting transaction information, including at least a transaction amount, into the point of sale terminal;
    printing an authorization to debit the payer bank account by the transaction amount for the payer to sign;
    the payer signing the authorization;
    returning a copy of the signed authorization and the check to the payer; and
    electronically debiting said payer bank account by said transaction amount based on the signed authorization, without using the check as a negotiable instrument.

25. The checkwriting point of sale process of claim 24, further comprising voiding the completed check prior to returning it to the payer.

26. The checkwriting point of sale process of claim 24, wherein the inputting of transaction information is provided by an electronic cash register.

27. The checkwriting point of sale process of claim 24, further comprising checking payer and/or account information on a database for an approval prior to printing the authorization; and
    proceeding with the transaction only upon an approval.

28. The checkwriting point of sale process of claim 24, wherein the electronic debiting is performed by an electronic fund transfer accomplish by ACH or Federal Reserve system.

* * * * *